(12) United States Patent
Leistner et al.

(10) Patent No.: US 6,188,473 B1
(45) Date of Patent: Feb. 13, 2001

(54) METHOD AND SYSTEM FOR PHOTODETECTION OF PHOTON-COUNTING AND CURRENT OPERATION

(75) Inventors: Hermann Leistner, Birkenfeld; Jörg Eppler, Keltern; Rüdiger Retzlaff, Neuenbürg, all of (DE)

(73) Assignee: Stratec Electronik GmbH, Birkenfeld (DE)

(*) Notice: Under 35 U.S.C. 154(b), the term of this patent shall be extended for 0 days.

(21) Appl. No.: 08/853,714

(22) Filed: May 9, 1997

(30) Foreign Application Priority Data

May 9, 1996 (DE) .............................................. 196 18 601

(51) Int. Cl.[7] ...................................................... G01J 1/00
(52) U.S. Cl. ................................................................. 356/213
(58) Field of Search .................... 356/213, 226, 356/38; 250/574

(56) References Cited

U.S. PATENT DOCUMENTS

| | | | |
|---|---|---|---|
| 3,715,586 | * 2/1973 | Thomas et al. | 250/83.3 R |
| 3,953,127 | * 4/1976 | Ahlquist et al. | 356/103 |
| 5,157,250 | 10/1992 | Oikari et al. | |

FOREIGN PATENT DOCUMENTS

| | | |
|---|---|---|
| 2535103 | 2/1977 | (DE) . |
| 3923847 | 2/1991 | (DE) . |
| 3915692 | 5/1992 | (DE) . |
| 4417529 | 12/1994 | (DE) . |
| 4420572 | 12/1995 | (DE) . |
| 4422580 | 12/1995 | (DE) . |
| 2186075 | 12/1986 | (GB) . |

OTHER PUBLICATIONS

Morgan et al., "Photon Correlation System for Fluorescence Lifetime Measurements", Rev. Sci. Instrum. 66(7), Jul. 1995, pp. 3744–3749.

Wungkobkiat et al., "Automatic Fluorescence Microphotometer Using an Image Dissector Tube", Applied Optics, vol. 18, No. 17, Sep. 1, 1979, pp. 2950–2962.

Gratton et al., "Microprocessor–controlled Photon–counting Spectrofluorometer", Rev. Sci. Instrum. 54(3), Mar. 1983, pp. 294–299.

Flach et al., "Laser–induced Fluorescence–line–narrowing studies of impurity–ion systems . . . ", Physical Review B, vol. 15, No. 3, Feb. 1, 1977, pp. 1248–1260.

* cited by examiner

Primary Examiner—Frank G. Font
Assistant Examiner—Tu T. Nguyen
(74) Attorney, Agent, or Firm—Antonelli, Terry, Stout & Kraus, LLP

(57) ABSTRACT

The invention relates to a method and a system for photodetection in which measurement signals during photon-counting operation and current operation can be tapped off in parallel at a photomultiplier through two channels, one of which is a photon-counting (pulse-counting) channel and the other an analog signal transfer channel. The signals are stored continuously and processed in a microprocessor. The two-channel operation allows the dynamic range of the photomultiplier to be expanded, in which, for each time interval, the measured value for the light to be measured is selected on the basis of an adjustable range limit from the channel that operates as a photon counter or the channel that is operated in the current mode.

32 Claims, 1 Drawing Sheet

METHOD AND SYSTEM FOR PHOTODETECTION OF PHOTON-COUNTING AND CURRENT OPERATION

BACKGROUND OF THE INVENTION

The invention relates to a method and system therefor for photodetection in which measurement signals in the form of signal pulses during a photon-counting operation are tapped off at a photomultiplier, the signal pulses being indicative of incident photons of the light being measured. Methods, systems and devices therefor which employ such photodetection schemes are particularly useful in chemical engineering, especially for performing highly sensitive analyses based on the principle of chemoluminescence or bioluminescence, such as luminescence immunoassays for example, reporter gene assays, or DNA assays. For such purposes, it is necessary to record the luminescence process, which occurs as a rule in the seconds range, with time resolution, with a high dynamic range being required for detecting the light quanta to investigate samples of an unknown concentration. In this connection, it is important to note that samples, as a rule, are investigated automatically at a high throughput rate and that they can only be measured once after the luminescence reaction has started.

To guarantee a high detection sensitivity, for example, in a known photodetection system for performing high sensitivity analyses based on the principle of chemoluminescence or bioluminescence, the photomultiplier that serves as the opto-receiver is employed in a so-called single-photon counting operation. In such operation, the photomultiplier provides sufficient amplification because of the presence of the selected high voltage and the many dynode stages to cause the generation of pulses of current or voltage that can effect the triggering of a single photoelectron. The voltage pulses thus produced can be distinguished from background noise by a discriminator. Depending on the quantum yield of the photocathode, therefore, individual incident photons can be detected. The disadvantage of this process, however, is that the bandwidth of known pulse amplifiers is insufficient at higher light intensities to resolve individual events in time without dead time losses. At higher photon rates, so-called pile-up effects cause problems, due to an overlapping of pulses.

It is also known in conjunction with the operation of photomultipliers to amplify the output signals in analog fashion in the so-called current mode, in which the detection sensitivity is reduced by suitable adjustment of the operation voltage, although higher light intensities can still be measured. The disadvantage of this operating mode, in addition to a reduced sensitivity, lies particularly in the low long-term stability caused primarily by changes in the quantum efficiency of the photocathode and multiplication fluctuations that result from dynode fatigue and hysteresis.

SUMMARY OF THE INVENTION

It is a main objective of the present invention to realize an improved photodetection method and a system therefor employing such method which performs high sensitivity analysis such that light measurements with a high degree of accuracy are achievable over a wide dynamic range.

This as well as other objectives are realizable according to a method and system therefor of the invention, defined in the appended claims, from the brief description hereinbelow as well as from the detailed description of the illustrated embodiment (although not limited thereto).

Briefly, the invention calls for wiring the photomultiplier with two channels, with one channel operating as a photon counter which responds to the pulsing action effected by the signal pulses tapped at the photomultiplier and the other channel operating in an analog mode for detecting higher light flux values. That is, the invention proposed in accordance with the improved method and system therefor, calls for a current signal, triggered by the photons, to be derived at the photomultiplier parallel to the signal pulses and the measured value for the light to be measured during each of the time intervals is determined from the number of pulses below a range limit that can be set, and from the current signal above the range limit. To permit automatic range selection, the range limit is advantageously set to have a predetermined upper limiting value for the number of pulses. It is advantageous, in this connection, for the upper limiting value to be determined from a pulse count range in which the photomultiplier can be operated as a photon counter at a given operating voltage. To process the current signals, also, it is advantageous for a current integrated measurand to be formed during each of the time intervals from the current signal amplified in analog fashion.

According to one preferred embodiment of the invention, a correction factor for drift compensation of the current integrated measurand is determined at predetermined time intervals from the pulse number and the current integrated measurand associated therewith, in time. This makes it possible to utilize the pulse count that can be performed on the basis of noise signal discrimination with high accuracy to compensate for long-term drift of the analog current signal. This can be accomplished by the correction factor being determined as a quotient of the measured number of pulses and the current integrated measurand associated therewith, timewise.

Advantageously, the photocathode of the photomultiplier is illuminated at predetermined time intervals by a pulsed calibration light source, preferably designed as a light emitting diode (LED), to determine the correction factor. The possibility of adjusting the intensity of the light source allows the photomultiplier to be operated at a working point that is suitable for the photon-counting operation as well as for current operation.

Another improvement can be accomplished by monitoring the functional readiness of the photomultiplier during illumination by the calibrating light source, with the number of pulses being compared with an anticipated value. In this fashion, at least the theoretical function of the photomultiplier as a photon counter can be checked.

As an alternative to using a calibration light source, the correction factor can be determined using the light to be measured. For this purpose, the correction factor is determined at time intervals during which the number of pulses is between the upper limiting value and a lower limiting value, with the photomultiplier being operated up to the lower limiting value in current operation and up to the upper limiting value in photon-counting mode.

Advantageously, zero point drift can be compensated by determining an offset compensation value from the current integrated measurand or the current signal during dark measurements repeated at time intervals. In this way, the drift-compensated measured value for the light to be measured can be calculated by multiplying the difference between the current integrated measurand and the offset compensation value with the correction factor just determined. It is also advantageous, when a predetermined threshold value is exceeded for the current signal or the current integrated measurand, that the operating voltage of the photomultiplier be reduced automatically in order to reduce the risk of damage to the detector. Advantageously, a measured value obtained at a reduced operating voltage is rejected as invalid.

From the circuit standpoint, it is advantageous for the current signal to be derived through a resistor from the first or second dynode stage, located downstream from the photocathode of the photomultiplier. If the photocathode is at ground potential, a signal can be conducted at a low potential level to the amplifier. The signal pulses can be tapped off advantageously through a capacitor to unblock the high voltage at the anode of the photomultiplier.

To permit digital processing, the current integrated measurand can be formed by effecting voltage-to-frequency conversion of the current signal into a proportional pulse frequency and adding the pulses thus obtained during each time interval. It is also advantageous for the number of pulses obtained at intervals during a measuring phase and the current integrated measurands to be stored continuously as value pairs and for the valid measured value of the light to be measured to be determined from the value pairs during the measuring pauses. This allows a high time resolution to be obtained without the calculation steps required during measured value processing limiting the interval time that can be achieved.

In a system for photodetection, it is proposed, as a solution to the problem posed above, to provide an analog amplifier that receives a current signal from the photomultiplier as well as a means for selecting the measuring range, so that during each of the time intervals, below a range limit that can be determined, the pulse number and, above the range limit, the current signal amplified in analog fashion, can be selected automatically to determine the measured value of the light to be measured. For digital processing, the current signal amplified in analog fashion is converted by a voltage-to-frequency converter and a counter, located downstream from the voltage-to-frequency converter, into a current integrated measurand.

According to one preferred embodiment of the invention, although not limited thereto, the means for selecting the range is a computer-supported processing unit, for example, a microprocessor, which is supplied with the value for the pulse number and the current integrated measurand. In this way, both values are available for further side-by-side processing. The choice of the valid measured value can be made by the processing unit by which the current integrated measurand or the number of pulses is selected for each time interval depending on the upper limiting value of the number of pulses that forms the range limit. Advantageously, the numbers of pulses and current integrated measurands obtained during a measurement phase are continuously assigned to the individual time intervals and stored in a data memory.

BRIEF DESCRIPTION OF THE DRAWINGS

The invention will now be described in greater detail with reference to an embodiment shown schematically in the accompanying illustration, in which:

The single FIGURE shows a block diagram of a system for photodetection.

Figure 1:
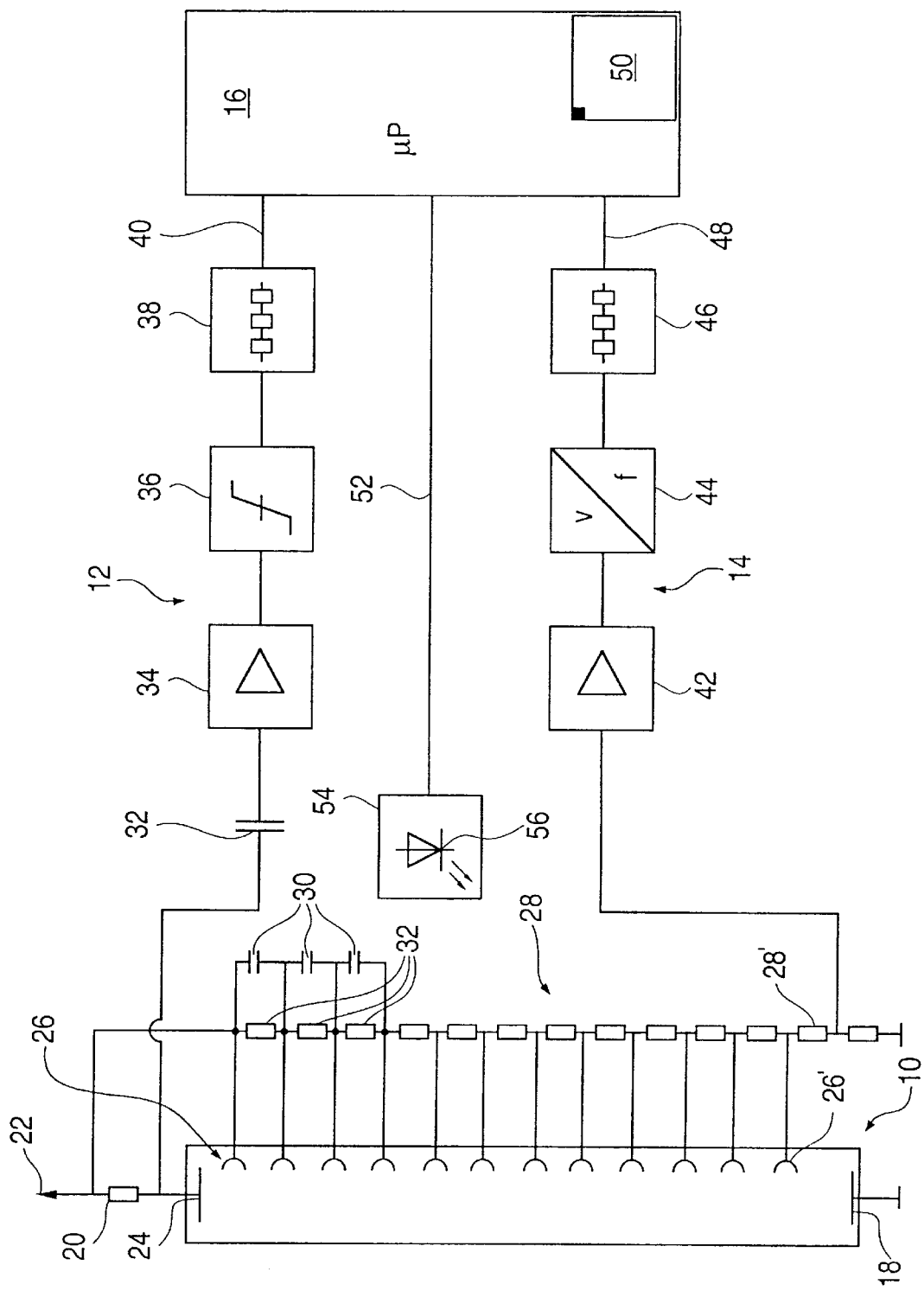

The photodetection system shown in the drawing consists, essentially, of a photomultiplier 10, a photon-counting channel 12, and an analog channel 14, as well as a microprocessor 16. Photomultiplier 10 has a photocathode 18 connected to ground, an anode 24 connected through a resistor 20 to a high-voltage source 22, and a cascade arrangement 26 of dynodes, which are positively biased at respectively different levels by a voltage divider 28 composed of resistors connected in series. The last three dynode stages upstream from anode 24, which have the highest current requirement, are additionally voltage-stabilized by connecting capacitors 30 in parallel with the corresponding divider resistors 32.

A broadband pulse amplifier 34, located in photon-counting or pulse channel 12, is connected on the input side through a capacitor 32 with anode 24 of photomultiplier 10. At the output of amplifier 34, a pulse-height discriminator 36 is connected downstream, the discriminator allowing only those pulses to pass that exceed a predetermined, adjustable threshold height. The output signal of pulse height discriminator 36 is fed to a 16-bit counter 38 which is connected through an 8-bit-wide data channel 40 with microprocessor 16. Counter 38 can be reset to zero by microprocessor 16 through control leads, not shown.

The analog amplifier 42, located in analog channel 14, is connected on the input side through a resistor 28' of voltage divider 28 with first dynode stage 26'. For an analog-to-digital (A/D) conversion, the output of amplifier 42 is connected with a voltage-to-frequency converter 44 whose output signal is stored in a 16-bit counter 48 which, in turn, is connected through an 8-bit-wide data channel 48 with microprocessor 16. Counter 46 can be reset to zero by the microprocessor through control leads, not shown.

In microprocessor 16, an evaluation program is loaded for processing the data to be input. The data can be stored in a digital memory 50 and can be displayed by a display or output device, not shown. Microprocessor 16 is also connected through a control lead 52 with an LED driver 54. By controlling driver 54, an LED 56 can be enabled, for example, by a stabilized driver current.

The operation of the system will be described in greater detail below. In response to incident photons of the light to be measured, photoelectrons are released from photocathode 18. The photoelectrons are multiplied at dynodes 28 by secondary electron emission without the signal/noise ratio being significantly deteriorated thereby. Because of the high amplification produced by secondary electron multiplication, individual current or voltage pulses can be counted at anode 24 that are each produced by a single photoelectron (photon counting). The voltage pulses tapped off through capacitor 32 are amplified by high-speed amplifier 34 and transmitted to the pulse-height discriminator. The throughput threshold of this discriminator is set to a level which discriminates against incoming lower amplitude noise pulses. This makes use of the fact that thermally emitted electrons are, initially, slightly slower and, hence, the associated pulses are slightly smaller than those of the photoelectrons. The incoming signal pulses which have amplitudes above the threshold level have the same height and width regardless of their previous form once they are transmitted through the pulse-height discriminator 36. As a result of the selection process, therefore, only the pulses triggered by photons are counted in the counter. The counting result is read as a pulse number at predetermined time intervals of 5 minutes, for example, from microprocessor 16 through data channel 40. Counter 38 is then reset to zero.

At higher photon currents, however, fluctuations occur in the linear behavior of the photon counter. These are caused, primarily, by the dead time behavior of amplifier 34 and overlapping effects of the individual pulses. Therefore, in order to be able to perform measurements at higher light intensities, analog channel 14 is provided.

Photomultiplier 10 is used in a so-called current operation with analog channel 14. The secondary electrons that have been triggered produce a measurable signal already at first dynode stage 26', the signal being conducted to an analog amplifier 42 as an input current through resistance 28'. Although the amplification at the first dynode 26' is small, derivation of the current signal at this point is desirable because amplifier 42 can then be operated as a reference potential relative to ground. Incidentally, it would also be possible to pick off the current signal at one of the higher dynode stages or even at anode 24. Therefore, no individual events are counted in analog channel 14, but the dynode current is amplified continuously. In order to digitize the signal obtained, the output voltage of amplifier 42 is converted by voltage-to-frequency converter 44 and the pulses thus obtained are added as current intensity values in counter 46 during the time intervals provided. Counter 46 is read through data channel 48, parallel to counter 38, by microprocessor 16 and then reset.

In order to achieve a high quantum yield during a photon-counting operation, the high voltage of source 22 is usually set to a value such that the pulse-counting rate realized at a given photon rate reliably reaches a saturation value. However, since the dark rate increases relative to the signal rate with increasing high voltage, the high voltage must be reduced for current operation because threshold value discrimination is not then possible. Hence, the high voltage in this system is set so that the pulse counting rate just reaches the saturation value. Hence, photomultiplier 10 operates at a working point that is still sufficient for both operating modes.

Because of the parallel preparation as well as the current value of the pulse count and the current integrated measurand, it is possible by using microprocessor 16, depending on a range limit in each time interval, to select the value that is most suitable for the measuring conditions at the moment. This choice is made so that an upper limiting value is set for the number of pulses at which reliable single-photon counting is still possible. The measured value for the light to be measured is then calculated in each time interval below and above this boundary value from the pulse count, from the current integrated measurand. In order not to limit the time resolution by the counting rate of microprocessor 16, in investigations of light events with time limits, the counter values of each of the counters 38 and 46 are continuously read into memory 50 and evaluated only during the measurement pauses to determine the measured value that is valid in each case.

While pulse channel 12 can be operated, essentially, free of drift by pulse height discrimination, signal deviations occur in analog channel 14 that are produced primarily by temperature fluctuations and instabilities in multiplier tubes 10 and analog amplifier 42. Parallel signal detection in this case offers the possibility of automatic drift compensation. For this purpose, photocathode 18 is irradiated by LED 56 at set time intervals. The photon rate is selected by an adjusting driver 54 in such fashion that photon counting is possible and that, at the same time, the current signal at dynode 26' reaches a sufficient signal strength. In this manner, a correction factor can be determined from the measurement result of the two channels 12 and 14, the correction factor being formed as the quotient of the drift-free pulse number and the current integrated measurand associated timewise. Incidentally, it is also possible to determine the correction factor with reference to the measured light. In this case, only those time intervals are taken into account during which the photon rate is at a working point that is favorable for both kinds of operations for photomultiplier 10. This range can be established in a linear range of pulse-counting rates using suitable boundary values. Further, in order to rule out the fluctuations in the zero point value of channel 14, an offset compensation value is determined form the current integrated measurand by dark measurements repeated at time intervals. For those time intervals during which analog channel 14 supplies the valid value, the measured value for the light to be measured can be calculated by multiplying the difference between the current integrated measurand and the offset compensation value by the correction value just determined in each case.

Additional monitoring functions can also be performed with the system described above. By using illumination with the calibrating light source (LED 56), the basic functional readiness of at least pulse channel 12 can be checked, with the number of pulses being compared with a value anticipated for the illumination provided. In addition, on the basis of the analog signal of amplifier 42, in a feedback loop or with reference to the current integrated measurand by means of microprocessor 16, monitoring can be performed to determine whether the irradiation of photocathode 18 is exceeding an admissible maximum value. If this is the case, the high voltage is automatically reduced to avoid damage to multiplier tubes 10.

In summary, the following can be said: the invention relates to a method and a system for photodetection in which measurement signals in photon-counting operation and current operation can be picked off in parallel from a photomultiplier 10 through the two channels 12 and 14. The signals are stored continuously and processed in a microprocessor 16. The two-channel operating mode allows the dynamic range of photomultiplier 10 to be expanded, with the measured value for the light to be measured being selected for each time interval on the basis of a range limit that can be set, from the channel 12 that operates as a photon counter or from channel 14 operated in the current mode.

What is claimed is:

1. A method for providing photodetection in which signal pulses, generated by a photomultiplier in accordance with incident photons of light being measured, are provided at a first output tap of the photomultiplier and in which a pulse count per unit time is determined by addition of individually detected signal pulses provided by a discriminator circuit during set time intervals, characterized in that a current signal triggered by the photons is provided at a second output tap of the photomultiplier in parallel with the signal pulses, the first and second output taps having a voltage divider therebetween, and in that in each of the time intervals a value representing the light measurement which is below a set threshold is determined from the pulse count and that which is above the set threshold is determined from the current signal.

2. The method according to claim 1, characterized in that the set threshold includes a pre-determined upper limiting value of the number of pulses.

3. The method according to claim 2, characterized in that the upper limiting value is determined from a pulse count range in which the photomultiplier is operating in a photon-counting mode at a given operating voltage.

4. The method according to claim 1, characterized in that a current integrated measurand is formed in each of the time intervals from the current signal that is amplified in an analog fashion.

5. The method according to one of claim 4, characterized in that a correction factor for drift compensation of the current integrated measurand is determined at predetermined time intervals from the pulse counter and the current integrated measurand associated timewise.

6. The method according to claim 5, characterized in that the correction factor is constituted the quotient of the pulse count determined and the current integrated measurand associated timewise.

7. The method according to claim 5, characterized in that a photocathode of the photomultiplier is illuminated at predetermined time intervals by a calibrating light source that is pulsed to determine the correction factor.

8. The method according to claim 7, characterized in that functional readiness of the photomultiplier is monitored during illumination by the calibrating light source, with the number of pulses being compared with an anticipated value.

9. The method according to claim 5, characterized in that the correction factor is determined by means of the light to be measured at time intervals such that, the pulse count there at is between the upper limiting value and a lower preset limiting value.

10. The method according to one of claims 1, characterized in that an offset compensating value for zero point compensation is determined by dark measurements repeated at time intervals from a current integrated measurand of the current signal.

11. The method according to claim 10, characterized in that the difference between the current integrated measurand and the offset compensation value is multiplied by a correction factor last determined to determine the measured value for the light to be measured above the range limit.

12. The method according to claim 1, characterized in that when a predetermined threshold value of the current signal or of a current integrated measurand formed from the current signal in each of the time intervals is exceeded, an operating voltage of the photomultiplier is automatically reduced, with a measured value obtained during reduced operating voltage being rejected.

13. The method according to claim 1, characterized in that the current signal is derived through a resistor from a first or second dynode stage of the photomultiplier located downstream from the photocathode of the photomultiplier, the photocathode being at ground potential.

14. The method according to claim 1, characterized in that the signal pulses are tapped off through a capacitor at an anode of the photomultiplier.

15. The method according to claim 1, characterized in that a current integrated measurand, formed from the current signal in each of the time intervals, is formed by voltage-to-frequency conversion of the current signal into a proportional pulse frequency and by adding the pulses thus obtained during each time interval.

16. The method according to claim 1, characterized in that pulse counts and current integrated measurands obtained from the current signal during a measuring phase in the time intervals are continuously stored as value pairs and in that the valid measured values for the light to be measured are determined from the value pairs during measurement pauses.

17. The method according to claim 7, characterized in that said calibrating light source includes an LED.

18. A system for photodetection comprising a photomultiplier that amplifies, as signal pulses, photoelectrons that are triggered by incidental photons of light to be measured, a pulse height discriminator coupled to receive amplified signal pulses from the pulse amplifier, and a counter that adds the signal pulses transferred thereto by the pulse height discriminator at successive time intervals, forming a pulse count each time, and further comprising another amplifier which is supplied with a current signal from the photomultiplier and outputs an analog signal, the signal pulses and the analog signal are provided at different tapped output locations of said photomultiplier, and means for measured value selection such that, for each time interval, the pulse count or the analog signal can be selected automatically to determine the measured value for the light to be measured.

19. The system according to claim 18, characterized in that the analog signal can be converted by a voltage-to-frequency converter and a counter, located downstream from the voltage-to-frequency converter, into a current integrated measurand that can be processed digitally.

20. The system according to claim 19, characterized in that the means for measured value selection includes a processing unit, the processing unit being supplied with the value for the pulse count and with the current integrated measurand, and the processing unit selecting the pulse number for each of the time intervals below an adjustable range limit and the current signal amplified analog-wise above the range limit.

21. The system according to claim 20, characterized in that the range limit is formed by an upper limiting value of the pulse count that is stored in processing unit.

22. The system according to claim 20, characterized in that the processing unit compares the current integrated measurand with a stored threshold value and if the threshold value is exceeded, the processing unit triggers a voltage-limiting stage that reduces the operating voltage of the photomultiplier.

23. The system according to claim 20, characterized in that the processing unit controls a calibrating light source for calibrating the photomultiplier with pulses timewise.

24. The system according to claim 18, characterized in that the analog amplifier is connected through a resistor with a first dynode stage of the photomultiplier, with a photocathode of the photomultiplier being at ground potential.

25. The system according to claim 24, characterized in that the pulse amplifier is connected by a capacitor with an anode of the photomultiplier.

26. The system according to one of claim 20, characterized in that the processing unit has a data memory in which the pulse counts and current integrated measurands obtained during a measurement phase can be stored continuously as value pairs.

27. The system according to claim 20, characterized in that the processing unit establishes a correction factor for drift compensation of the current integrated measurand from the values of the pulse count and the current integrated measurand obtained during calibration.

28. The system according to claim 23, characterized in that said calibrating light source includes an LED.

29. The system according to claim 20, characterized in that the processing unit is a computer-supported processing unit.

30. The system according to claim 29, characterized in that the computer-supported processing unit includes a microprocessor.

31. The system according to claim 18, characterized in that the pulse amplifier is a broadband pulse amplifier.

32. A method for providing photodetection in which signal pulses generated by a photomultipliers, in accordance with incident photons of light being measured, are derived at an output of the photomultiplier and in which a pulse count per unit time is determined by addition of individually detected signal pulses provided by a discriminator circuit during set time intervals, characterized in that a current signal triggered by the photons is derived at the photomultiplier in parallel with the signal pulses, and in that in each of the time intervals a value representing the light measurement which is below a set threshold is determined from the pulse count and that which is above the set threshold is determined from the current signal, and characterized in that a current integrated measurand is formed in each of the time intervals from the current signal that is amplified in an analog fashion, and in that a correction factor for drift compensation of the current integrated measurand is determined at predetermined time intervals from the pulse counter and the current integrated measurand associated timewise.

* * * * *